United States Patent [19]
Okano et al.

[11] Patent Number: 4,762,882
[45] Date of Patent: Aug. 9, 1988

[54] MODIFIED POLYOLEFIN RESIN AND A COMPOSITION CONTAINING THE SAME

[75] Inventors: Shigeaki Okano, Atsugi; Katsuhiko Hayashi, Machida; Yoshiteru Sakurazawa, Kawasaki; Yoshinori Suga, Machida, all of Japan

[73] Assignee: Mitsubishi Chemical Industries Limited, Tokyo, Japan

[21] Appl. No.: 878,660

[22] Filed: Jun. 26, 1986

[30] Foreign Application Priority Data

Jul. 8, 1985 [JP] Japan .................... 60-149823

[51] Int. Cl.$^4$ .................. C08F 255/08; C08F 255/10; C08L 51/06; C08L 23/00
[52] U.S. Cl. ........................ 525/74; 525/78; 525/80; 525/71; 525/72; 525/73; 525/282; 525/285; 525/286; 525/288; 525/301; 525/309; 525/81; 525/304; 525/75; 525/77; 525/289; 525/296; 525/303
[58] Field of Search ................ 525/74, 78, 285, 301

[56] References Cited

U.S. PATENT DOCUMENTS

| | | | |
|---|---|---|---|
| 4,011,382 | 3/1977 | Levine et al. | 526/96 |
| 4,330,639 | 5/1982 | Matsuura et al. | 525/240 |
| 4,440,911 | 4/1984 | Inoue et al. | 525/74 |
| 4,612,155 | 9/1986 | Wong et al. | 525/74 |
| 4,619,972 | 10/1986 | Inoue et al. | 525/285 |

FOREIGN PATENT DOCUMENTS

| | | |
|---|---|---|
| 59-179543A | 10/1984 | Japan . |
| 61-014272A | 1/1986 | Japan . |
| 2006232 | 5/1979 | United Kingdom . |
| 2116187A | 9/1983 | United Kingdom . |

Primary Examiner—Carman J. Seccuro
Attorney, Agent, or Firm—Oblon, Fisher, Spivak, McClelland & Maier

[57] ABSTRACT

A modified polyolefin resin and a composition containing therein such modified polyolefin, having excellent adhesive property and heat-sealing property at the time of high speed forming operations, the modified polyolefin resin consisting essentially of: a copolymer of ethylene and α-olefin having 4 or more carbon atoms, the copolymer having a density in a range of from 0.890 to 0.910 g/cm$^3$, a ratio of a weight-average molecular weight (Mw) to a number-average molecular weight (Mn) of Mw/Mn=2 to 15, and a product of a melt tension (g) and a melt-index (g/10 min.) of a molten resin measured at 160° C. of 4 or below; and unsaturated carboxylic acid or derivatives thereof grafted on the ethylene type copolymer at a ratio of from 0.01 to 3% by weight.

4 Claims, No Drawings

MODIFIED POLYOLEFIN RESIN AND A COMPOSITION CONTAINING THE SAME

BACKGROUND OF THE INVENTION

1. Field of the Invention

This invention relates to a modified polyolefin resin and a composition containing the same.

Polyolefins modified with polymerizable monomers having in their molecules a polar group such as unsaturated carboxylic acid and its derivatives have been widely used for imparting adhesive property, dying property, and miscibility with other resins to those polyolefins which are primarily non-polar, hence no adhesive property and compatibility with other polar substances, and for producing a composite material by blending such polyolefins and other substances. For instance, such modified polyolefins are used for the manufacture of a multi-layered film and sheet in the form of a laminated product with metals or polar resins (such as polyamide, polyester, copolymer of ethylene and vinyl alcohol, polyvinyl halide, and so forth). Besides this, the modified polyolefins are also used for adhesion between a coated protective layer and a metal constituting a metal shaped article. Further, such polyolefin per se or a composition containing the same in it is used for obtaining a composition having good dispersibility and excellent mechanical strength, with increased compatibility and adhesivity between filler, pigment, etc. and the matrix resin. In certain other cases, the modified polyolefin per se is present in the matrix resin in a state of its being in a favorable dispersion to thereby improve impact resistance and other properties of the matrix resin.

The present invention is directed to the modified polyolefin resin capable of being widely used in such use, and, in particular, to a resin composition effective for manufacture of a composite film or sheet.

2. Description of Prior Arts

The technique of modifying an ethylene type copolymer containing ethylene as the principal constituent (hereinafter abbreviated as "polyethylene") with a polar monomer has been well known. Above all, polyethylene which has been modified with unsaturated carboxylic acid or its anhydride possesses good adhesion with metal, epoxy resin, and so forth, hence it is used for a metal pipe coating, etc., and moreover such modified polyethylene is capable of producing a composite of a high barrier resin by joining a composite film or sheet composed of the ethylene type resin with nylon, ethylene and vinyl alcohol copolymer, polycarbonate resin, polyethylene terephthalate, aluminum foil, etc., on account of which it has been widely used as the food packing material.

There are several kinds of polyethylene used for modified polyethylene such as high pressure method, low density polyethylene ($\rho = 0.915$ to $0.930$ g/cm$^3$), medium or low pressure method, high density polyethylene ($\rho > 0.94$ g/cm$^3$), medium or low pressure method, medium density polyethylene ($\rho = 0.93$ to $0.95$ g/cm$^3$), and so forth. A linear copolymer of much lower density is disclosed in, for example, Japanese Unexamined Patent Publication No. 165413/1982, which is directed to a metal laminate body using a linear, low density polyethylene having a density of 0.915 to 0.935 g/cm$^3$ (which will hereinafter be abbreviated as "LLDPE").

According to that invention, use of LLDPE would contribute to improve the adhesive strength and the stress-cracking resistance of the resin composition. However, while the resin composition to be obtained with use of LLDPE might be superior in its adhesive strength and the stress-cracking resistant property to the resin composition with the conventional medium or low pressure method, high density polyethylene and high pressure method, low density polyethylene as the base material, it must be said that such resin composition still falls short of its adhesive strength and heat-sealing property at the time of high speed molding of the resin composition, which is the principal performance to be the gist of the present invention.

Further, Japanese Unexamined Patent Publication No. 170940/1982 discloses a modified polyethylene using a medium or low pressure method ethylene copolymer having a density of from 0.900 to 0.940 g/cm$^3$. In the examples of this Japanese Unexamined Patent Publication, however, there is only description of an example of the modified polyethylene having a density in a range of from 0.920 to 0.925 g/cm$^3$, and nothing is said about the effect to be derived from the characteristics of the polyethylene according to the present invention with the exception of the description such that, when used for coating of metal material, such modified polyethylene provides excellent durability in adhesion (such as resistance to warm water, resistance to stress-cracking, and so forth).

Furthermore, as a copolymer having a much lower density, there has been known a modified resin obtained by modification of a copolymer of ethylene and $\alpha$-olefin with a low degree of crystallization in a range of from 30% to a few percent ($\rho = 0.86$ to $0.88$ g/cm$^3$) and a copolymer rubber of ethylene and $\alpha$-olefin ($\rho = 0.86$ to $0.87$ g/cm$^3$) of much lower density. For example, Japanese Unexamined Patent Publication No. 82/1979 discloses a blend of a modified polymer obtained by grafting maleic anhydride on a copolymer of ethylene and $\alpha$-olefin having a degree of crystallization of 30% or below and a crystalline polyolefin resin. However, examples in this Unexamined Japanese Patent Publication disclose only a copolymer having a density of not reaching 0.89 g/cm$^3$ (which is expressed in terms of a comonomer composition), but not a single description can be seen in it as to the effect to be derived from definition of the physical properties that can be expressed by a value of a product of melt tension and melt-index of the polymer material. Besides this, there have been proposed various techniques of blending an unmodified rubbery copolymer and a modified substance of a crystalline polyolefin, and so on, although no use has ever been made of a polymer having the density and the characteristics as that of the present invention.

Possibility of obtaining a copolymer having a density of from 0.890 to 0.910 g/cm$^3$ by copolymerization of ethylene and $\alpha$-olefin has been known per se. This technique, however, has not been put into practice upto recent years, because of various difficulties to be overcome for the purpose of its production in an industrialized scale, such as manner of handling the polymer (in particular, agglutination of polymer particles), increase in components soluble in solvent, and others. In recent years, such industrialized production has become feasible owing to improvement in the slurry polymerization method or improvement in the gas-phase polymerization method.

SUMMARY OF THE INVENTION

The present inventors have conducted studies and researches as to applicable extent of such low density polyethylene, as the result of which they have found out that, of those polyethylenes of such low density range, use of a low density polyethylene having a particular range of physical properties would contribute to improve various properties required of the modified polyethylene having excellent adhesive property. On the basis of this finding, they have arrived at the present invention.

It is therefore an object of the present invention to provide a modified polyolefin resin and a composition containing therein such modified polyolefin having excellent adhesive property and heat-sealing property at the time of high speed molding.

It is another object of the present invention to provide a composite body of the modified polyolefin having a high rate of adhesive sustaining ratio at a relatively high temperature.

According to the present invention, in one aspect thereof, there is provided a modified polyolefin resin, which consists essentially of: a copolymer of ethylene and α-olefin having 4 or more carbon atoms, said copolymer having a density in a range of from 0.890 to 0.910 g/cm$^3$, a ratio of a weight-average molecular weight (Mw) to a number-average molecular weight (Mn) of Mw/Mn=2 to 15, and a product of a melt tension (g) and a melt-index (g/10 min.) of a molten resin measured at 160° C. of 4 or below; and unsaturated carboxylic acid or derivatives thereof grafted on said ethylene type copolymer at a ratio of from 0.01 to 3% by weight.

According to the present invention, in another aspect of it, there is provided a modified polyolefin resin composition, which consists essentially of: (1) a modified polyolefin resin composed of a copolymer of ethylene and α-olefin having 4 or more carbon atoms, said copolymer having a density in a range of from 0.890 to 0.910 g/cm$^3$, a ratio of a weight-average molecular weight (Mw) to a number-average molecular weight (Mn) of Mw/Mn=2 to 15, and a product of a melt tension (g) and a melt-index (g/10 min.) of a molten resin measured at 160° C. of 4 or below, and unsaturated carboxylic acid or derivatives thereof grafted on said ethylene type copolymer at a ratio of from 0.01 to 3% by weight; and (2) unmodified polyolefin type resin blended with said modified polyolefin resin at a ratio of from 1:99 to 99:1 (by weight) with a content of said unsaturated carboxylic acid or derivatives thereof present in said blended composition ranging from 0.01 to 1% by weight.

The foregoing objects, other objects as well as specific ingredients to obtain the modified copolymer, and method and conditions for such modification according to the present invention will become more apparent and understandable from the follow-detailed description thereof when read in connection with several preferred examples thereof.

DETAILED DESCRIPTION OF PREFERRED EMBODIMENTS

By the use of the modified polyolefin resin composition according to the present invention, there can be obtained a polymer blend capable of exhibiting its adhesive strength even under stringent shaping conditions and having a high adhesive sustaining ratio at a relatively high temperature.

For the production of the low density polyethylene satisfying such requirements, there may be adopted a method as disclosed in Japanese Unexamined Patent Publications Nos. 68306/1984, 230011/1984, and others.

When ethylene and α-olefin are subjected to the copolymerization under the conditions as described in these Japanese Unexamined Patent Publications, using the catalysts as described therein, there can be obtained a copolymer having a density of from 0.890 to 0.910 g/cm$^3$. It should however be noted that the present invention is not necessarily restricted to the polymerization method and polymerization catalysts as disclosed in these Japanese Unexamined Patent Publications, but any other methods may be possibly adopted, provided that the copolymerization is effected with use of the Ziegler catalyst.

The copolymer to be obtained is a copolymer of ethylene and α-olefin ($\rho$=0.890 to 0.910 g/cm$^3$). However, since the copolymer produced by using propylene as the α-olefin is somewhat inferior in its mechanical strength, etc. for the purpose of its use as the base resin for the modified resin, it is preferable to use a copolymer of the α-olefin having 4 or more carbon atoms, or more particularly, the α-olefin having from 4 to 8 carbon atoms, from the aspect of the physical properties of the copolymer, though a quantity of propylene may be included for the copolymerization. The molecular weight distribution of the copolymer may be indicated in terms of distribution by flow ratio (FR) of the molten polymer and gel-permeation chromatography (GPC). Those copolymers having relatively narrow distribution of Mw/Mn in a range of from 2 to 15 (or more preferably below 10) and an FR value of 30 or below indicate favorable result. When a ratio of Mw/Mn exceeds 15, the shaping property of the copolymer resin becomes superior, but its required adhesive strength lowers. From the standpoint of melt tension as an index for the degree of branching, those copolymers having a low melt tension per melt-index, and a product of the melt tension (g) and the melt-index (g/10 min.) of 4 or below, or more preferably 2.5 or below, are desirable. When this value exceeds 4, the shaping property of the copolymer resin becomes satisfactory, while its adhesive strength as required becomes lowered. With the high pressure method polyethylene as the branching type polymer, its melt tension after the grafting reaction increases, even if it has a low density, thus inviting unfavorable result.

As the monomer for the modification, use may be made of unsaturated carboxylic acid or its derivatives. Examples of the unsaturated carboxylic acid are: acrylic acid, methacrylic acid, maleic acid, fumaric acid, itaconic acid citraconic acid, and so forth. Suitable derivatives of the unsaturated carboxilic acids include acid anhydrides, esters, amides, imides, metal salts, and so on, examples of which are: maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, hydroxyethyl acrylate, hydroxybutyl acrylate, maleic acid monoethyl ester, maleic acid diethyl ester, fumaric acid monomethyl ester, fumaric acid dimethyl ester, itaconic acid monomethyl ester, itaconic acid diethyl ester, acryl amide, methacrylamide, maleic acid monoamide, maleic acid diamide, maleic acid-N-monoethyl amide, maleic acid-N,N- diethyl amide, maleic acid-N-monobutyl amide, maleic acid-N,N-dibutyl amide, fumaric acid monoamide, fumaric acid diamide, fumaric acid-N-monoethylamide, fumaric acid-N,N-diethylamide, fumaric acid-N-monobutylamide, fumaric acid-N,N-dibutylamide, maleimide, N-butyl maleimide, N-phenyl maleimide, sodium acrylate, sodium methacrylate, potassium acrylate, potassium methacrylate, and others. Furthermore, as the alicyclic unsaturated carboxylic acids, the following are appropriate examples thereof: cis-4-cyclohexene-1,2-dicarboxylic anhydride (commonly called tetrahydrophthalic anhydride), cis-4-cyclohexene-1,2-dicarboxylic acid (commonly called tetrahydro-phthalic acid), endo-bicyclo[2,2,1]-5-heptene-2,3-dicarboxylic anhydride (commonly called high mix acid anhydride), endo-bicyclo[2,2,1]-5-heptene2,3-dicarboxylic acid (commonly called high mix acid), endo-bicyclo[2,2,1]-1,2,3,4,7,7-hexachloro-2-heptene-5,6-dicarboxylic anhydride (commonly called chlordanic anhydride), endo-bicyclo[2,2,1]-1,2,3,4,7,7-hexachloro-2-heptene-5,6-dicarboxylic acid (commonly called chlordanic acid), and others.

As the other polar monomer, there may be used vinyl chloride, vinyl acetate, vinyl formamides (e.g., N-vinyl formamide), vinyl ethers, vinyl silanes (e.g., triethoxy vinyl silane), and others.

Moreover, at the graft-modification of these polar monomers, there may also be effected mixed use of the above-listed monomers or graft copolymerization of the non-polar monomers (e.g., styrene, etc. as disclosed in Japanese Unexamined Patent Publication No. 34659/1972) with a view to improving the graft efficiency, the adhesive property, and so forth.

To an extent that does not impair the characteristics of the present invention, there may also be feasible to carry out improvement by blend of second and third polymers. Examples of such improvement are: blending of a rubber component, blending of low crystalline polyethylenes having much lower density, blending of ethylene-vinyl acetate copolymer, ethylene-ethyl acrylate copolymer, and so forth. For the purpose of this blending, the techniques as disclosed in Japanese Unexamined Patent Publications Nos. 98784/1976, 80334/1977, etc. may be used.

For the grafting reaction, there may usually be adopted any known methods. That is to say, it is only sufficient that the polyolefin, the unsaturated carboxylic acid or its monomeric derivatives, and a radical generator be brought into mutual contact under such conditions that the radical generator may effectively act on these components. For this grafting reaction, there may be used any of various methods such as the melt-kneading method using an extruder, etc.; the solution method, by which the polymer is dissolved into a solvent; the slurry method, in which the polymer particles are suspended in a medium; and the gas phase method.

With a view to improving the adhesive capability, it is also possible to treat the copolymer with an epoxy resin or a poly-functional compound, etc. containing therein the amino group, the hydroxyl group, and so forth during or after the grafting reaction, or to adopt a method of removing the unreacted monomers and the by-produced volatile components by the operations of simple heating, washing, or else.

The quantity of the monomer to be modified by the grafting may preferably be in a range of from 0.01 to 10% by weight in terms of the weight of the base resin, on which the grafting is to be done. More preferred range may be from 0.01 to 3% by weight. Further, in a blend of the modified polyolefin resin and the unmodified polyolefin resin, it is desirable that the monomer may be so mixed as to bring its quantity in a range of from 0.01 to 5% by weight, or more preferably from 0.01 to 1% by weight, in terms of the quantity of the modified monomer in the total composition. Outside the above-mentioned range, when the quantity of the modified monomer is small, the adhesive strength as intended by the present invention is not sufficient; and when its quantity is large, not only gelation, coloring, deterioration in the polymer, and so forth tend to readily occur at the time of the grafting reaction, but also improvement in the adhesive property can no longer be recognized.

In the present invention, the modified polyolefin resin as obtained in the above-described manner is useful per se, and can be employed for various purposes, but it can also be used in the form of a composition blended with unmodified polyolefin resin.

As the unmodified polyolefin resin to be blended with the graft-modified polyolefin resin, there may be used any of those resins which are known generally as polyolefin. Examples of such unmodified polyolefin resins are: homopolymer of ethylene, copolymers of ethylene and other $\alpha$-olefins, homopolymer of propylene, copolymers of propylene and other olefins, homopolymer of $\alpha$-olefins having more number of carbon, copolymers of such $\alpha$-olefin of high carbon content and other $\alpha$-olefins, random copolymers of these olefins as the principal constituent and partially polymerizable other polar monomers, block copolymers, and graft copolymers. More concretely, there may be exemplified the following: high density polyethylene medium or low pressure method, linear low density polyethylene, high pressure method, low density polyethylene, copolymer of low crystalline ethylene and $\alpha$-olefin, copolymer rubber of ethylene and $\alpha$-olefin, copolymer rubber of ethylene, $\alpha$-olefin and diene, polypropylene, copolymer of propylene and $\alpha$-olefin, polybutene-1, poly-4-methyl-pentene-1, poly-3-methylbutene-1, copolymer of ethylene and vinyl ester (e.g., copolymer of ethylene and vinyl acetate), copolymer of ethylene and acrylic acid ester (e.g., copolymer of ethylene and ethyl acrylate), copolymer of ethylene and unsaturated carboxylic acid (e.g., copolymer of ethylene and acrylic acid), polyethylene modified with unsaturated carboxylic acid, polypropylene modified with unsaturated carboxylic acid, and so forth.

The blending of the modified polyethylene having the particular physical properties according to the present invention and these polyolefins can be usually done by an extruder, a kneader, Banbury mixer, and other mixing and kneading machines. The blending ratio may be in a range of from 1:99 to 99:1 (by weight), or preferably from 5:95 to 95:5 (by weight), or more preferably from 20:80 to 80:20 (by weight), or so. From the standpoint of economy, however, a range of from 10:90 to 60:40 (by weight) is highly preferable.

It is also possible to add to the adhesive composition to be used in the present invention various additives such as stabilizers, pigments, fillers, and so on, which are usually used in the polyolefin resins, within such an extent that does not impair its effect of adhesiveness. It is further possible to add thereto various reforming materials such as copolymer rubber of ethylene and $\alpha$-olefin, and others.

The modified polyolefin obtained by graft-modification of such polyolefin, or the adhesive composition prepared by use of such modified polyolefin possesses characteristics such that not only it exhibits high degree of adhesiveness at a normal temperature by being combined with polar resins, metals, and so on, but also it loses its adhesive capability to a less extent even at a relatively high temperature, hence it is superior to those conventional compositions in respect of its exhibiting a well-balanced performance.

Furthermore, the resin composition according to the present invention possesses appropriate melting point and pliability, in addition to which it has good seal-forming property as a heat-sealing layer for a composite film, hence it exhibits excellent capability in its sealing strength as well as heat-resistant sustaining property of the sealing strength in comparison with those of ethylene/vinyl acetate copolymer which has conventionally been used.

The polar resin layer to be used for this purpose may be exemplified as follows: ethylene/vinyl alcohol copolymer, polyamide resin, polyester resin, polyvinyl halide, and so forth.

The ethylene/vinyl alcohol copolymer is one obtained by partially or substantially totally saponifying the acetic acid group in the ethylene-vinyl acetate copolymer to turn it into the hydroxyl group. There is no restriction to its chemical composition. For example the ethylene/vinyl alcohol copolymer having an average molecular weight of from 10,000 to 100,000 and the ethylene content of from 10 to 70 mol % is usually used. In consideration, however, of the gas-barrier property, the film forming property, and so forth of the copolymer, it is preferable to use the ethylene/vinyl alcohol copolymer obtained by saponifying the ethylene/vinyl acetate copolymer with the ethylene content of from 50 to 30 mol % in a manner to bring its degree of saponification to 90% or higher.

As the polyamide resin, there may be used those linear high polymers having the amide bond and to be obtained by opening the ring of lactam, condensation of diamine and dicarboxylic acid, and so on; for example such linear high polymers having an average molecular weight of from 15,000 to 60,000 and $[\eta]=1.0$ to 6.0, or so are used. Examples of such linear high polymers that can be used are: Nylon 6, Nylon 6.6, Nylon 6.10, Nylon 11, Nylon 6.11, Nylon 6T, and so forth. Further, there may also be used polyester amide, polyether amide, polyamide-imide, etc. containing in its molecules those bonds other than amide.

The polyester resin refers to a thermoplastic polyester resin which is principally composed of dibasic acid and diol. Representative examples of such polyester resins are: polyethylene terephthalate, polybutylene terephthalate, polyethylene isophthalate, polyethlener 2,6-naphthalene dicarboxylate, polyphenylene terephthalate, copolycondensate of bisphenol A and terephthalic acid, and other aromatic polyesters. These polyester resins may also be modified products which are partially softened with diol such as polyethylene oxide, glycol, etc. or plural copolycondensates such as polyester amide, polyester/ether amide, in which the polyamide component is partially mixed to be integrated.

Examples of the polyvinyl halides are: polyvinyl chloride, polyvinylidene chloride, and so forth.

As the metal for producing complex bodies by use of the adhesive resin according to the present invention, there may be exemplified aluminum, iron, stainless steel, and other ferrous alloys; copper, nickel, and so on. Of these metals, aluminum and iron are preferably used. These metal materials, at the time of producing a composite body, can be used in various forms such as foil, sheet, plate, tube, and various other configurations. Such metal materials may be subjected in advance to the surface treatment such as chromic acid treatment, titanium compound treatment, and others, which are effective for adhesion and corrosion-prevention. Use of those resins such as epoxy resin as the primer, depending on necessity, is the technique that can be applied to the manufacture of a laminated body which is the object of the present invention.

With a view to enabling those persons skilled in the art to put the present invention into practice, and to prove superiority of the present invention over the conventional product, the following preferred examples of the present invention and comparative examples of the conventional product are presented. It should be noted, however, that the present invention is not limited to these preferred examples alone, but any changes and modifications may be made in the ingredients used and the reaction conditions adopted, without departing from the spirit and scope of the invention as recited in the appended claims.

(Method for Measuring the Physical Properties)

(1) Melt-index (MI) and Flow Ratio (FR):

The melt-index (MI) was measured on the basis of a load of 2.16 kg in accordance with ASTM-D1238. Polyethylene type resin was measured at 190° C., and polypropylene type resin was measured at 230° C.

The flow ratio (FR) was measured in the same manner as mentioned above for the flow rate (g/10 min.) of the resin at the respective shearing stress of $10^6$ dyn/cm$^2$ and $10^5$ dyn/cm$^2$, from which a ratio of $Q_{10^6}/Q_{10^5}$ was found. The magnitude of the FR value is considered to correspond to the molecular weight distribution.

(2) Molecular Weight Distribution:

The molecular weight distribution was measured by the gel permeation chromatography (GPC). The device used for the measurement was Model "HLC-811" manufactured by Toyo Soda Manufacturing Co., Ltd., Japan, and two units of the chromatographic column (TSK-gel and GMH-6), each having 60 cm in length. The measurement was carried out at 140° C. using orthodichlorobenzene as the solvent. The molecular weight was expressed in terms of the polyethylene conversion.

(3) Thermal Analysis:

The measurement was done by the differential scanning calorimetry (DSC) method. The device used for the measurement was Model "Parkin-Elmar I".

(4) Melt Tension (MT):

An orifice having a diameter of 2 mm, a length of 8 mm, and an in-flow angle of 180° was mounted on a melt tension meter manufactured by Toyo Seiki K.K., Japan. The measurement was done at a temperature of 160° C., a quantity of extrusion of 0.25 g/min., and a take-up speed of 152 cm/min. Melt tension is expressed in g.

I. Manufacture of Polymer

The polymers as shown in Table 1 below were used.

TABLE 1

| | MI (g/10 min.) | MT (g) | MI × MT | Density (g/cm³) | Mw/Mn | FR | Melting point (°C.) | Heat of fusion (Kcal/g) |
| --- | --- | --- | --- | --- | --- | --- | --- | --- |
| Ⓐ *1  | 1.5  | 1.2  | 1.8   | 0.900 | 7.0  | 24 | 90  | 18   |
| Ⓑ *2  | 0.82 | 2.6  | 2.1   | 0.907 | 7.9  | 20 | 117 | 13.8 |
| Ⓒ *3  | 0.40 | 8.0  | 3.2   | 0.904 | 24.5 | 55 | 119 | 12.6 |
| Ⓓ *4  | 3.9  | 0.6  | 2.4   | 0.88  | 8.7  | 12 | 60  | 18   |
| Ⓔ *5  | 1.8  | —    | —     | 0.86  | 3.0  | 18 | —   | —    |
| Ⓕ *6  | 2.0  | 12   | 24    | 0.918 | 18.9 | 30 | —   | —    |
| Ⓖ *7  | 1.8  | 0.92 | 1.7   | 0.921 | 3.3  | 20 | 119 | —    |
| Ⓗ *8  | 0.7  | 6.2  | 4.3   | 0.925 | 10.2 | 65 | 116 | —    |
| Ⓘ *9  | 11   | <0.5 | <5.5  | 0.964 | —    | 22 | 134 | —    |
| Ⓙ *10 | 0.7  | —    | —     | 0.90  | —    | —  | 150 | —    |

(NOTE)
*1 Copolymer of ethylene and butene-1 as disclosed in Example 3 of Japanese Unexamined Patent Publication No. 68306/1984
*2 DFDA 1137 NT (polyethylene) produced by Union Carbide Corporation, U.S.A.
*3 DFDA 1138 NT (polyethylene) produced by Union Carbide Corporation, U.S.A.
*4 Copolymer of ethylene and butene-1 as disclosed in Japanese Unexamined Patent Publication No. 82/1979
*5 JSR EPO2P (ethylene/propylene rubber) produced by Nippon Synthetic Rubber Co. Ltd.
*6 NOVATECH F250 (high pressure method, low density polyethylene) produced by Mitsubishi Chemical Industries Ltd.
*7 GP-2 (ethylene/butene-1 copolymer) produced by Union Carbide Corporation, U.S.A.
*8 GP-1 (ethylene/butene-1 copolymer) produced by Union Carbide Corporation, U.S.A.
*9 Medium or low pressure, high density polyethylene
*10 Propylene/ethylene copolymer

II. Manufacture of Modified Polyolefin 0.5 part by weight of maleic anhydride and 0.025 part by weight of α,α-di-t-butyl peroxyparaisopropylbenzene were mixed with 100 parts by weight of each of the polymers Ⓐ, Ⓑ, Ⓒ, Ⓓ, Ⓔ, Ⓕ, and Ⓖ as listed in Table 1 above. Then, the mixture was melted and kneaded at 230° C. by use of a single shaft extruder having an inner diameter of 30 mm and a length-to-diameter ratio of L/D=24 to thereby carry out the grafting reaction. The graft-modified polymer was sufficiently extracted with acetone to remove the unreacted monomers, after which the quantity of maleic anhydride as grafted was found by means of the infrared spectroscopy. The results are as shown in Table 2 below.

III. Manufacture of Resin Blend

Each of the above-mentioned graft-modified polymers was blended with various polyolefins. The blending operation was done by use of a single shaft extruder having an inner diameter of 40 mm. The polyethylene type resin was melted and kneaded at 210° C., while the propylene type resin was melted and kneaded at 230° C. The results are as shown in Table 2 below.

IV. Measurement of Adhesive Strength

The above-mentioned resin compositions and the saponified resin of ethylene/vinyl acetate copolymer ("SOANOL-E": a registered trademark for the resin product of Nippon Synthetic Rubber Co., Ltd.) was co-extruded through a die to thereby from a composite inflation film composed of a blended composition layer of modified ethylene copolymer (inner layer) and a saponified resin layer of ethylene/vinyl acetate copolymer (outer layer).

The co-extrusion was done through a die having an inner diameter of 80 mm at a die temperature of 210° C., an extruder at the side of the blended composition of modified ethylene copolymer having a diameter of 40 mm, L/D=24, and at a temperature of 210° C., and an extruder at the side of the saponified resin of ethylene-vinyl acetate copolymer having a diameter of 30 mm, L/D=20, and at a temperature of 210° C. The take-up speed of the composite inflation film was 6.5 m/min., its below-up ratio was 1.2, thickness of the saponified resin film of ethylene/vinyl acetate copolymer was 50 microns, and thickness of the blended composition of the modified ethylene copolymer was 50 microns.

In the next place, while maintaining the conditions for the extrusion by the extruder as they were, the film take-up speed and the cooling air quantity were controlled to thereby produce a composite film, each of the constituent resin layers having thickness of 25 microns. Measurement of this composite film for its T-shaped peeling strength was based on JIS K6854. The results of the measurements are as shown in Table 2 below.

EXAMPLES 1 to 5

Polyethylene Ⓐ was modified, with which various polyolefins were blended to prepare different polymer blends. Using these polymer blends and saponified resin of ethylene/vinyl acetate copolymer (EV-OH resin), a composite film was formed. These various composite films exhibited their favorable adhesive strength, though, depending on the resin to be blended, there was a difference in the value of such adhesive strength. The results are as shown in Table 2 below.

EXAMPLES 6 to 8

The same experiment as mentioned in the preceding Examples was conducted with use of polyethylene Ⓑ. The results are as shown in Table 2 below.

COMPARATIVE EXAMPLE 1

The same experiment as in Example 1 above was conducted by use of polymer Ⓒ with wide distribution of the molecular weight, though its density, etc. were within the predetermined range. The adhesive strength of the modified resin was lower than that of Example 1. The results are as shown in Table 2 below.

COMPARATIVE EXAMPLE 2

Polymer Ⓓ having its density slightly lower than the predetermined range was used. The resulted modified polymer exhibited its favorable adhesive strength at a normal temperature, but its adhesive sustaining ratio at 60° C. was lower than that of Example 3. The results are as shown in Table 2 below.

COMPARATIVE EXAMPLES 3 to 5

High pressure method, low density polyethylene was used. This polymer have a large melt tension characteristic due to its branching. The resulted modified resin exhibited its adhesive strength inferior to that the modified resin in Example 1 above, and its adhesive sustaining ratio was also low. The same results were obtained even in the case of blending high pressure method, low density polyethylene and propylene/ethylene copolymer, as shown in Table 2 below.

COMPARATIVE EXAMPLE 6

Modified resin of ethylene/propylene rubber was used. The resin showed its favorable adhesive strength at a normal temperature, but its adhesive sustaining ratio was also poor. The results are as shown in Table 2 below.

COMPARATIVE EXAMPLE 7

Using linear, low density polyethylene Ⓖ the same experiment as in Example 1 above was conducted. The resulted resin was poor in its adhesive strength in comparison with the resin of Example 1 above. The results are as shown in Table 2 below.

COMPARATIVE EXAMPLE 8

Using linear, low density polyethlene Ⓗ, the same experiment as in Example 1 above was conducted. The resulted resin was poor in its adhesive strength in comparison with the resin of Example 1 above, and its adhesive sustaining ratio was also poor. The results are as shown in Table 2 below.

high temperature condition, hence the resin according to the present invention is industrially useful.

What is claimed is:

1. A modified polyolefin resin, which consists essentially of:
    (a) a copolymer of ethylene and an α-olefin of at least 4 carbon atoms, said copolymer having a density in the range of from 0.890 to 0.910 g/cm$^3$, a ratio of the weight-average molecular weight (Mw) to the number-average molecular weight (Mn) of Mw/Mn=2 to 15, and a product of the melt tension (g) and the melt index (g/10 min) of the molten copolymer measured at 160° C. of no more than 4; and
    (b) an unsaturated carboxylic acid or derivative thereof grafted on said ethylene copolymer in an amount of from 0.01 to 3% by weight.

2. The modified polyolefin resin of claim 1, wherein said unsaturated carboxylic acid or derivative thereof is acrylic acid, ethacrylic acid, maleic acid, fumaric acid, itaconic acid, citraconic acid, maleic anhydride, citraconic anhydride, itaconic anhydride, methyl acrylate, methy methacrylate, ethyl acrylate, ethyl methacrylate, butyl acrylate, butyl methacrylate, glycidyl acrylate, glycidyl methacrylate, hydroxyethyl acrylate, hydroxybutyl acrylate, maleic acid monoethyl ester, maleic acid diethyl ester, fumaric acid monomethyl ester, fumaric acid dimethyl ester, itaconic acid monomethyl ester, itaconic acid diethyl ester, acrylamide, methacrylamide, maleic acid monoamide, maleic acid diamide, maleic acid-N-monoethyl amide, maleic acid-N,N-diethyl amide, maleic acid-N-monoethylamide, fumaric acid-N,N-dibutylamide, maleimide, N-butyl maleimide,

TABLE 2

| | Polyolefin used for modification | Quantity of maleic anhydride grafted (%) | Blending resin | Quantities of modified polyolefin in polymer blend (wt. %) | Adhesive strength with EV-OH resin (g/15 mm) [23° C.] 25μ/25μ | 50μ/50μ | 60° C. 50μ/50μ | Adhesive sustaining ratio at 23° C. (%) |
|---|---|---|---|---|---|---|---|---|
| Example 1 | Ⓐ | 0.48 | — | 100 | 320 | 780 | 550 | 0.71 |
| Example 2 | " | " | Ⓘ | 30 | 65 | 980 | 710 | 0.72 |
| Example 3 | " | " | Ⓔ | 30 | 350 | 800 | 560 | 0.70 |
| Example 4 | " | " | Ⓖ | 30 | 400 | 900 | 660 | 0.73 |
| Example 5 | " | " | Ⓙ | 30 | 120 | 350 | 260 | 0.73 |
| Example 6 | Ⓑ | 0.17 | — | 100 | 300 | 450 | — | — |
| Example 7 | " | " | Ⓕ | 30 | 70 | 650 | — | — |
| Example 8 | " | " | Ⓖ | 30 | 55 | 350 | — | — |
| Comparative Example 1 | Ⓒ | 0.20 | — | 100 | 30 | 120 | — | — |
| Comparative Example 2 | Ⓓ | 0.45 | Ⓔ | 30 | 310 | 720 | 470 | 0.65 |
| Comparative Example 3 | Ⓕ | 0.40 | — | 100 | 30 | 50 | 30 | 0.60 |
| Comparative Example 4 | " | " | Ⓔ | 30 | 45 | 65 | 45 | 0.70 |
| Comparative Example 5 | " | " | Ⓙ | 30 | 30 | 45 | 35 | 0.80 |
| Comparative Example 6 | Ⓔ | 0.36 | Ⓔ | 30 | 300 | 650 | 420 | 0.65 |
| Comparative Example 7 | Ⓖ | 0.37 | — | 100 | 60 | 145 | 100 | 0.70 |
| Comparative Example 8 | Ⓗ | 0.36 | — | 100 | 35 | 110 | 65 | 0.55 |

As described in the foregoing, when the modified polyolefin resin and the composition containing the same are used, there can be obtained a composite body which is excellent in its adhesive property as well as its heat-sealing property at a high speed forming, and which has high adhesive sustaining ratio at a relatively N-phenyl maleimide, sodium acrylate, sodium methacrylate, potassium acrylate, potassium methacrylate, cis-4-cyclohexene-1,2-dicarboxylic acid, endo-bicyclo-[5]-heptene-2,3-dicarboxylic anhydride, endo-bicyclo-[2,2,1]-5- heptene-2,3-dicarboxylic acid, endo-bicyclo[2,2,1]-1,2,3, 4,7,7-hexachloro-2-heptene-5,6-dicarboxylic anhydride, or endo-bicyclo[2,2,1]-1,2,3,4,7,7-hexachloro-2-heptene-5,6-dicarboxylic acid.

3. A modified polyolefin resin composition, which consists essentially of:
(a) a modified polyolefin resin composed of a copolymer of ethylene and an α- olefin having a carbon atom content of at least 5, said copolymer having a density within the range of from 0.890–0.910 g/cm$^3$, a weight-average molecular weight (Mw) to number-average molecular weight (Mn) ratio of 2 to 15, and a product of the melt tension (g) and the melt index (g/10 min) of the molten copolymer measured at 160° C. of no more than 4, and an unsaturated carboxylic acid or derivative thereof grafted on said ethylene copolymer in an amount of from 0.01 to 3% by weight; and
(b) an unmodified polyolefin resin blended with said modified polyolefin resin in a ratio of from 1:99 to 99:1(by weight), with the content of said unsaturated carboxylic acid or derivative thereof being present in the blended composition ranging from 0.01 to 1% by weight.

4. The modified polyolefin resin composition of claim 3, wherein said unmodified polyolefin resin is a high density polyethylene, a linear low density polyethylene, a low density polyethylene, a copolymer of a low crystalline ethylene and an α- olefin, a copolymer rubber of ethylene and an α- olefin, a copolymer rubber of ethylene, an α- olefin and a diene, a polypropylene, a copolymer of propylene and an α- olefin, a polybutene-1, a poly-4-methyl-pentene-1, poly-3-methylbutene-1, a copolymer of ethylene and a vinyl ester, a copolymer of ethylene and an acrylic acid ester, a copolymer of ethylene and an unsaturated carboxylic acid.

* * * * *